US010605508B2

(12) United States Patent
Goldman

(10) Patent No.: US 10,605,508 B2
(45) Date of Patent: Mar. 31, 2020

(54) HEATING AND COOLING AN ENVIRONMENT WITH WATER HEAT EXCHANGER

(71) Applicant: AquaCalor, Austin, TX (US)

(72) Inventor: Igor Alexander Goldman, Austin, TX (US)

(73) Assignee: AquaCalor, Austin, TX (US)

( * ) Notice: Subject to any disclaimer, the term of this patent is extended or adjusted under 35 U.S.C. 154(b) by 129 days.

(21) Appl. No.: 15/791,583

(22) Filed: Oct. 24, 2017

(65) Prior Publication Data
US 2018/0120011 A1 May 3, 2018

Related U.S. Application Data

(60) Provisional application No. 62/415,170, filed on Oct. 31, 2016.

(51) Int. Cl.
F25B 13/00 (2006.01)
F25B 7/00 (2006.01)
F25B 49/02 (2006.01)
F25B 41/00 (2006.01)
F24D 19/10 (2006.01)
F24D 3/18 (2006.01)

(52) U.S. Cl.
CPC ............ *F25B 49/022* (2013.01); *F24D 3/18* (2013.01); *F24D 19/1039* (2013.01); *F25B 13/00* (2013.01); *F25B 41/003* (2013.01); *F25B 7/00* (2013.01); *F25B 2313/003* (2013.01); *F25B 2313/0234* (2013.01); *F25B 2700/21* (2013.01); *Y02B 30/12* (2013.01)

(58) Field of Classification Search
None
See application file for complete search history.

(56) References Cited

U.S. PATENT DOCUMENTS

| 4,019,338 | A |   | 4/1977  | Poteet           |
|-----------|---|---|---------|------------------|
| 4,232,529 | A |   | 11/1980 | Babbitt et al.   |
| 4,279,128 | A |   | 7/1981  | Leniger          |
| 4,628,988 | A |   | 12/1986 | Yovanofski       |
| 4,667,479 | A |   | 5/1987  | Doctor           |
| 4,688,396 | A |   | 8/1987  | Takahashi        |
| 5,184,472 | A | * | 2/1993  | Guilbault ............... F25B 13/00 62/160 |
| 5,560,216 | A |   | 10/1996 | Holmes           |

(Continued)

*Primary Examiner* — Edward F Landrum
*Assistant Examiner* — Daniel C Comings
(74) *Attorney, Agent, or Firm* — Matheson Keys & Kordzik PLLC; Kelly Kordzik

(57) ABSTRACT

A heat pump system can be reversed to either heat or cool a controlled space, such as environment in a building. In a typical use, such as heat pump system extracts heat or cold energy from the surrounding air around the building. A water-to-refrigerant heat exchanger is added to the refrigerant loop of the heat pump system along with a control system to operate water flow and a thermal energy exchange process. Addition of the water heat exchanger can add the heat or cold energy stored in a pool, or other external water reservoir, into the heat or cold exchanging process. Depending upon surrounding conditions, the automatic control system can switch in-between the energy sources, or use a combination of them, to improve efficiency the heat pump system.

18 Claims, 8 Drawing Sheets

(56) References Cited

U.S. PATENT DOCUMENTS

| | | |
|---|---|---|
| 6,253,564 B1 | 7/2001 | Yarbrough et al. |
| 6,536,221 B2 | 3/2003 | James |
| 8,776,780 B2 | 7/2014 | Roseberry |
| 2008/0034765 A1* | 2/2008 | Takegami ............... F25B 13/00 |
| | | 62/175 |

* cited by examiner

HEATING AND COOLING AN ENVIRONMENT WITH WATER HEAT EXCHANGER

This application claims priority to U.S. provisional patent application Ser. No. 62/415,170, which is hereby incorporated by reference herein.

TECHNICAL FIELD

This invention relates to heat transfer systems, such as heat pumps and air conditioning systems, and more particularly to using water from a water reservoir to increase the efficiency of such heat transfer systems during their cooling and heating cycles and simultaneously, if needed, to heat or cool the water reservoir, such as a pool, spa, water heater, or other body, or mass, of water.

SUMMARY

When a heat pump is operating in a cooling mode (i.e., in order to reduce a temperature of an environment within a building or structure), the heat from the building (e.g., a dwelling) is transferred to the outside and needs to be dissipated. Normally, the transferred heat dissipates into the external ambient environment (e.g., external to the building), but in accordance with embodiments of the present invention, an addition of a separate water-to-refrigerant heat exchanger selectively allows the transferred heat to dissipate into water of a water reservoir (thus operating as a heat sink) either located internally (e.g., inside of the building) or externally from the building (e.g., outside of the building), and thus further benefit from the better efficiency of the water-to-refrigerant heat exchanger and lower water temperature of the water reservoir. Embodiments of the present invention will selectively allow, for example, heating of the water in a swimming pool when desired, so as to extend the swim season, or to heat water in a water reservoir for use in the building.

If the water reservoir temperature is sufficiently cold enough to absorb all the heat through the refrigerant during the cooling process, an automatic control system, configured in accordance with embodiments of the present invention, can deactivate the heat pump outdoor unit air heat exchanger (e.g., by turning off the fan that flows air past the coils of the outdoor unit) so that the heat pump is operating in a water-cooling mode only. If the water reservoir temperature is not sufficiently cold enough to absorb all the heat through the refrigerant during the cooling process, such an automatic control system, considering the temperature of the refrigerant exiting from the water heat exchanger, can additionally activate (turn on) a fan of the heat pump outdoor unit air heat exchanger so that the heat pump operates in a combinational mode, as described herein. If heating of the water in the water reservoir is not needed, such an automatic control system can turn on the fan of the heat pump outdoor unit air heat exchanger, and deactivate the water pump, so that the heat pump operates in a normal air-cooling mode.

In accordance with embodiments of the present invention, when the heat pump is operating in a heating mode in order to increase a temperature in an environment within the building), the automatic control system can compare the outdoor ambient air temperature (e.g., an environment outside of the building) with the water reservoir temperature and, if the water temperature is greater than the temperature of the outdoor air, turn off the fan of the heat pump outdoor unit air heat exchanger, and turn on a water pump associated with the water reservoir to thereby run water through the water heat exchanger to extract heat from the water instead of from the colder air. Correspondingly, the heat transferred from the water to the refrigerant of the water heat exchanger decreases the water temperature, which in the exemplary case of a swimming pool, has an added benefit of helping keep it clean without (or at least with a lower amount of) pool water chemicals.

As an example, applicants have determined that a residential pool typically contains a sufficient quantity of water having a capacity to absorb a considerable amount of cold energy from one or more environments of a dwelling via a the water-to-refrigerant heat exchanger (such as during the wintertime months), which can decrease, or even eliminate, the need for use of conventional gas or electric heaters to warn such environment(s) in the dwelling on cold temperature days, thus saving about 30% and above in energy bill payments in at least moderate climates. In accordance with embodiments of the present invention, the water from the water reservoir can be used as a heat source for the heat pump before the water temperature drops below a heat pump heating balance point temperature, regardless of the outdoor air temperature, which could be well below the balance point temperature. Thus, embodiments of the present invention allow for use of a heat pump to heat a building even with relatively low outdoor temperatures when otherwise a typical commercially available heat pump would be already turned off and a conventional gas or electric heater would be forced into use. If the surrounding environmental (ambient) air is warmer than the water in the water reservoir, the automatic control system can turn off the water pump and turn on the air heat exchanger fan so that the heat pump operates in a normal air heat exchange mode.

DETAILED DESCRIPTION

While these exemplary embodiments are described in sufficient detail to enable those skilled in the art to practice embodiments of the present invention, it should be understood that other embodiments may be realized and that various changes to embodiments of the present invention may be made without departing from the spirit and scope of the present invention. Thus, the following more detailed description is not intended to limit the scope of the invention, as claimed, but is presented for purposes of illustration only to describe the features and characteristics of embodiments of the present invention, and to sufficiently enable one skilled in the art to practice the invention.

Figure 1:
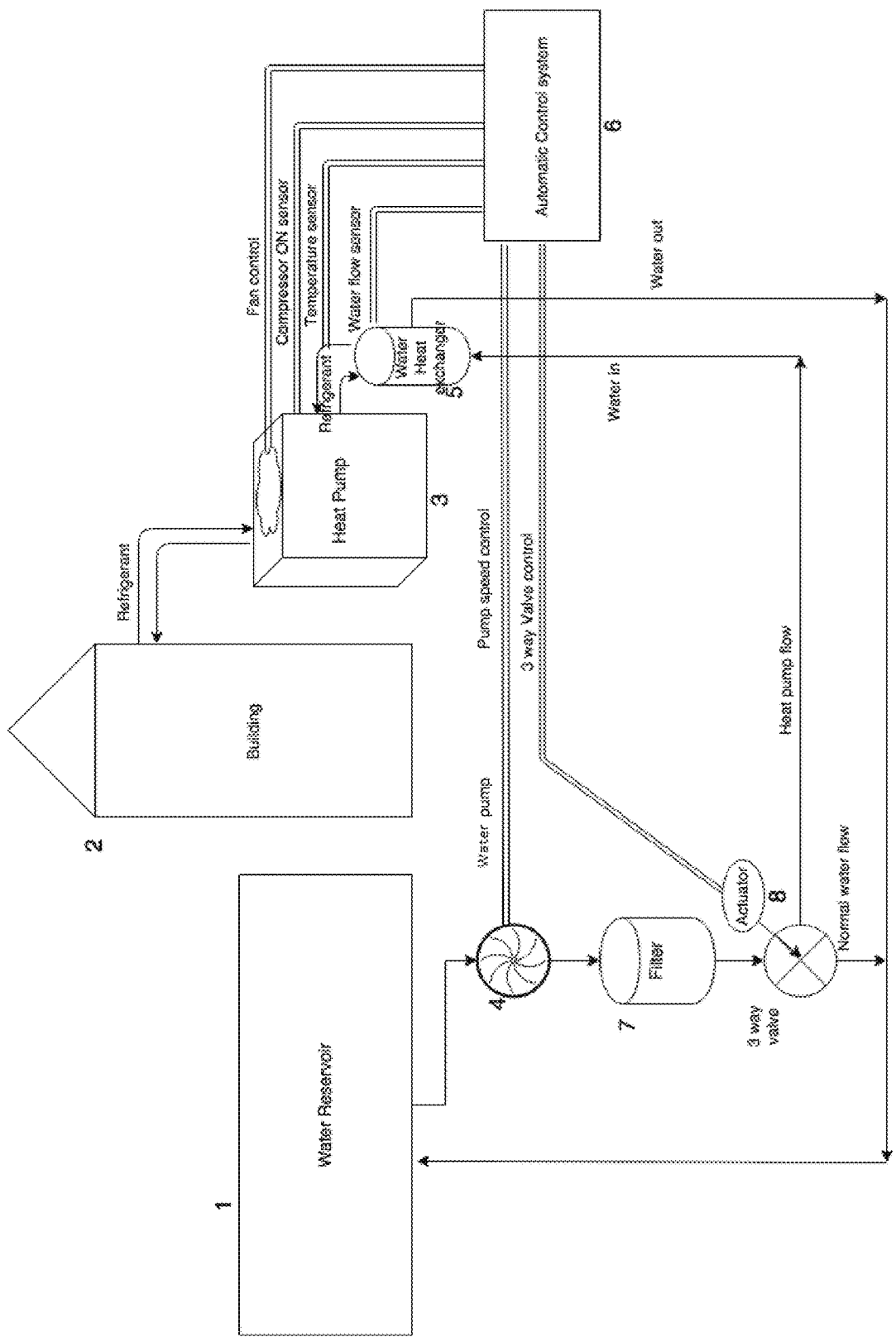
FIG. 1 illustrates a schematic block diagram of a system configured in accordance with embodiments of the present invention, which includes a heat pump combined with a water heat exchanger under control of an automatic control system.
Figure 2:
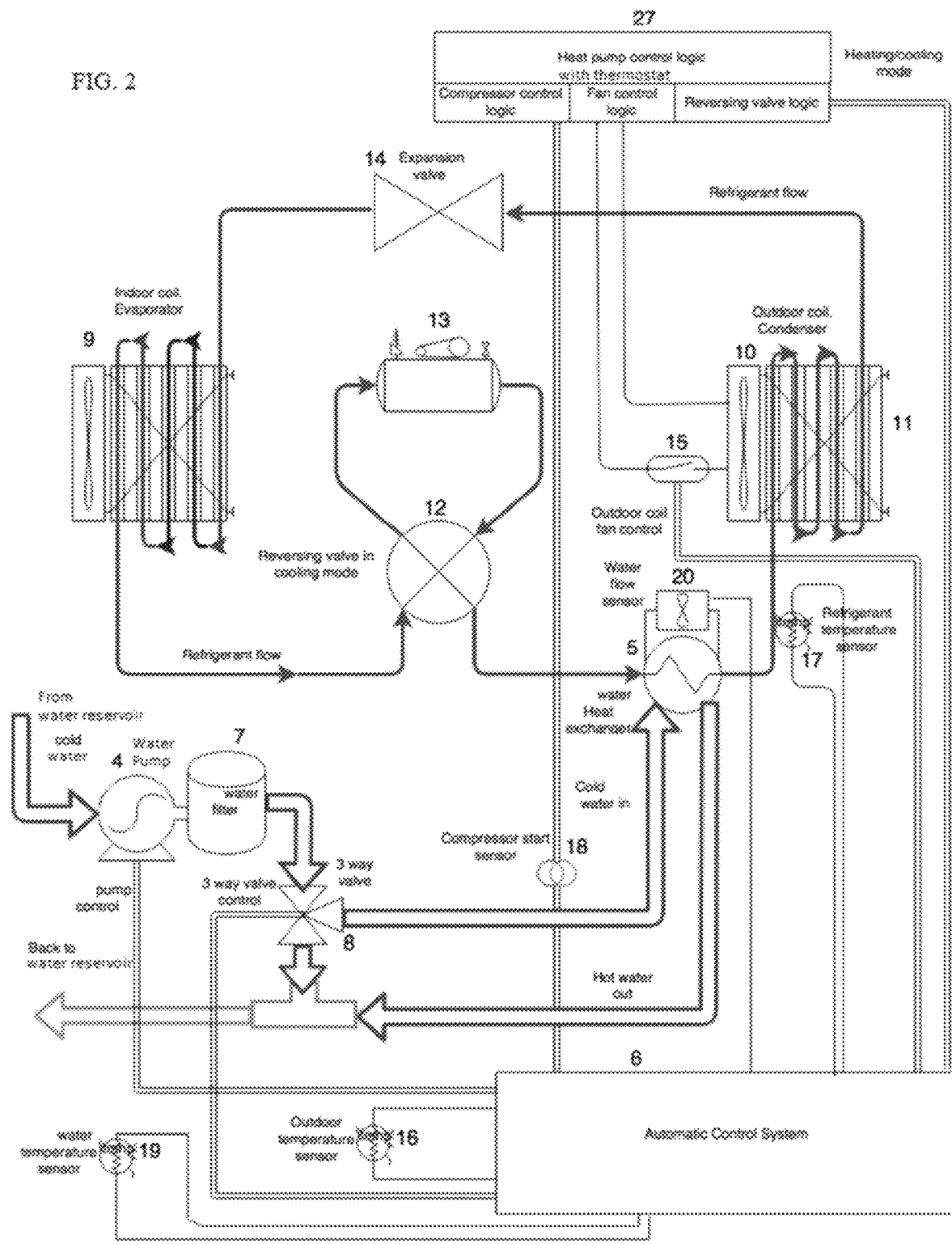
FIG. 2 illustrates a schematic block diagram of the system of FIG. 1 operating in a cooling mode in accordance with embodiments of the present invention.
Figure 3:
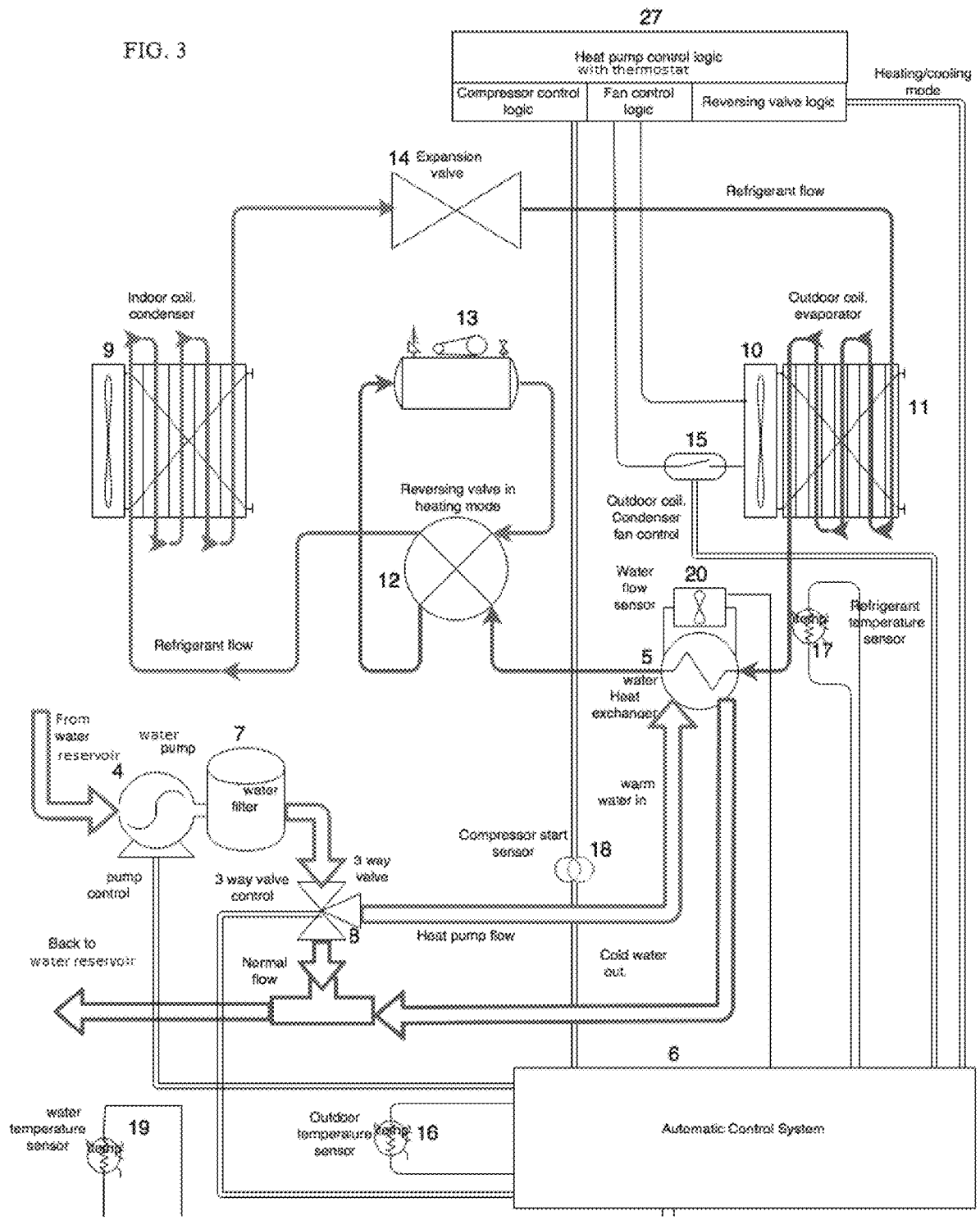
FIG. 3 illustrates a schematic block diagram of the system of FIG. 1 operating in a heating mode in accordance with embodiments of the present invention.

FIG. 1 illustrates a schematic block diagram of a system, configured in accordance with embodiments of the present invention, for heating and/or cooling one or more environments within a building 2, in which the system is configured to utilize a water reservoir 1 (e.g., including, but not limited to, an indoor or outdoor swimming pool or spa, or any suitable reservoir containing a body of water located internally or externally with respect to the building 2) as a heat source and/or a heat sink, as the case may be. Referring to FIGS. 2 and 3, a conventional commercially available heat pump system for cooling and/or heating one or more environments in a building (e.g., one or more rooms or floors) includes an indoor air handler unit 9 (which includes coils and a selectively controllable fan for moving air from an environment within the building 2 past the coils), and an outdoor heat pump unit 11 (which includes coils and a selectively controllable fan 10 for moving air from the ambient environment outside of the building 2 past the coils). The heat pump system also includes a compressor 13 that circulates a refrigerant through a refrigerant loop via a reversing valve 12 and an expansion valve 14 (and appropriately installed conduits), wherein the refrigerant is configured to absorb (i.e., capture) and release heat as it travels between these indoor and outdoor units. The heat pump system 3 (e.g., a conventional heat pump system), in accordance with embodiments of the present invention, is coupled to a water-to-refrigerant heat exchanger (herein also referred to as a "water heat exchanger") 5 and an automatic control system 6. As will be described in further detail with respect to FIGS. 2-3, the water heat exchanger 5 is coupled between the outdoor unit 11 and the reversing valve 12 associated with the compressor 13 of the heat pump system 3 so that the refrigerant of the heat pump system 3 additionally passes through the water heat exchanger 5.

Many typical water reservoirs 1 (e.g., an indoor or outdoor swimming pool or spa) have a water recirculation system (loop) with a water pump 4 configured for moving water into and out of the water reservoir 1, such as for filtering the water through a filtering apparatus 7. In accordance with embodiments of the present invention, the water recirculation system is configured to include a 3-way valve 8 with a well-known control actuator configured to divert water pumped out of the water reservoir 1 by the water pump 4 from returning directly back to the water reservoir 1 so that a portion, or all, of the flow of water instead passes through the water heat exchanger 5 (see Heat pump flow—Water in—Water out path depicted in FIG. 1) under command signals from the automatic control system 6.

Figure 7:
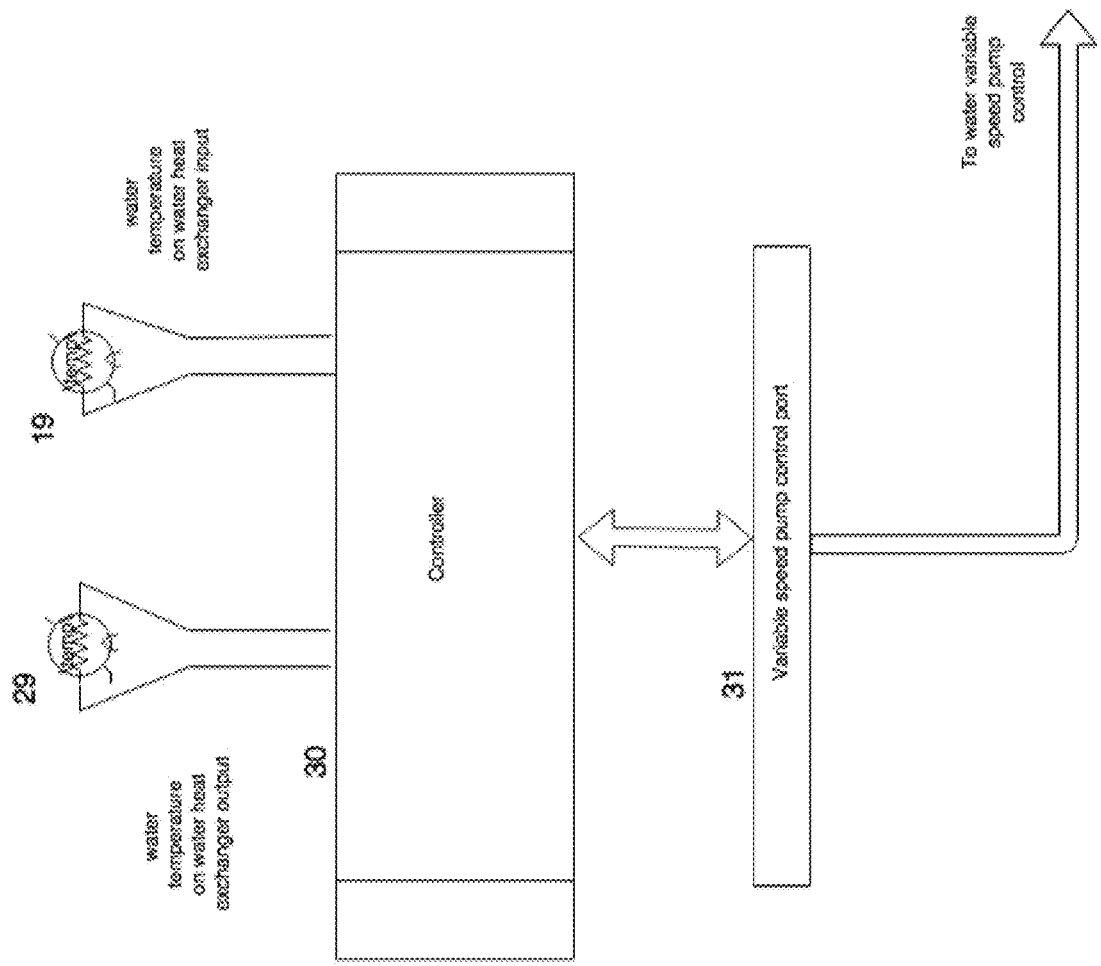
FIG. 7 illustrates a schematic block diagram of a water flow optimization configured in accordance with embodiments of the present invention.
Figure 7:
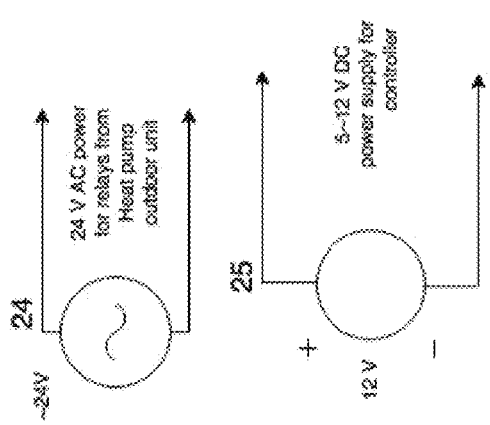
Figure 8:
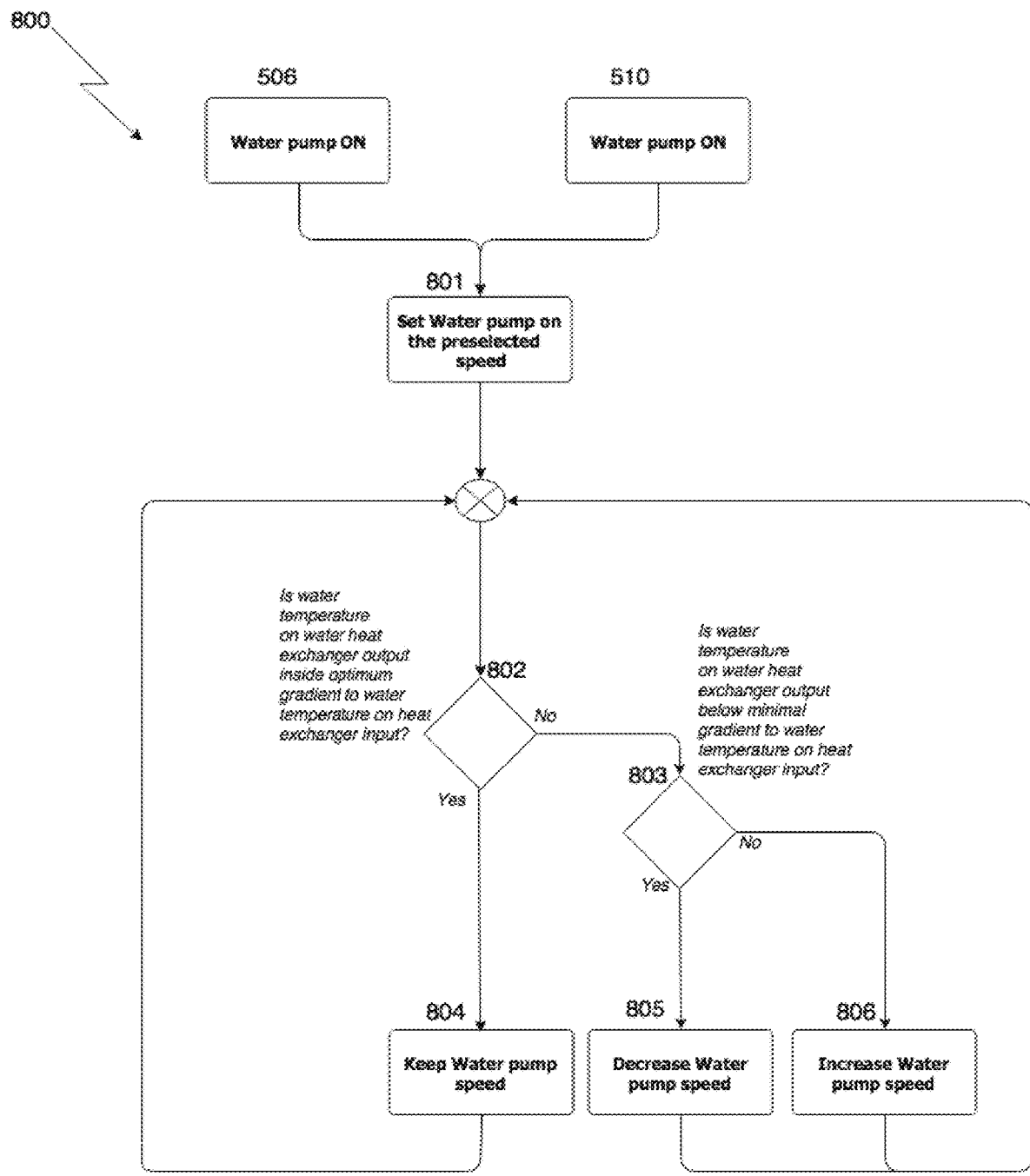
FIG. 8 illustrates a process block diagram of a water flow optimization configured in accordance with embodiments of the present invention.

Note that, in accordance with certain embodiments of the present invention, the automatic control system 6 may be configured to optimize the water flow through the water heat exchanger 5 using variable speed aspects of the water pump 4, if it is so configured to, operate at more than one speed (e.g., see FIGS. 7-8).

Note that the aforementioned 3-way valve of the water circulation system may be an existing 3-way valve previously installed within the water circulation system for various purposes designed within such a system. Alternatively, the 3-way valve may be separately installed within a water circulation system for purposes of implementing embodiments of the present invention, including, but not limited to, the 3-way valve replacing a previously installed valve of the water circulation system. Furthermore, in accordance with certain embodiments of the present invention, a valve, or system of valves, (and associated requisite piping) may be implemented to divert, water from the water reservoir 1 in situations where the water reservoir 1 did not previously have an existing water circulation system, such as if the water reservoir 1 is simply some body of water internally or externally located from the building 2 (e.g., a tank containing water (e.g., a rain water storage tank), pond, lake, creek, river, etc.). Likewise, embodiments of the present invention may be configured to utilize an existing water pump (e.g., the water pump 4) of a water circulation system, or a water pump (similar in operation to the water pump 4) may be separately installed with or without a valve, or system of valves, (and associated requisite piping) in order to transfer water from the water reservoir 1 to a water heat exchanger whether there already exists a water circulation system or not. Nevertheless, in accordance with embodiments of the present invention, any combination of pump(s), valve(s), and/or appropriate piping (also referred to herein collectively as a "water diversion system") may be utilized to circulate (transfer) water between the water reservoir 1 and the water heat exchanger 5 for the purposes described herein.

FIG. 2 illustrates a schematic block diagram of the system of FIG. 1 operating in a cooling mode, or cycle, in accordance with embodiments of the present invention. As will be described hereinafter and with respect to FIG. 5, various operations of embodiments of the present invention may be performed in accordance with algorithms configured to be run by the automatic control system 6.

In the cooling mode, the outdoor unit 11 of the heat pump system 3 is operating its coils as a condenser, while the indoor unit 9 is operating its coils as an evaporator. In accordance with embodiments of the present invention, the outdoor unit 11 may be physically located somewhere outside of the building 2. In accordance with embodiments of the present invention, the reversing valve 12 and associated conduits are configured to operate in such a cooling mode so that the heated refrigerant gas of the heat pump system 3, after being pressurized by the compressor 13, first passes through the water heat exchanger 5 and then proceeds to the coils operating as a condenser associated with the outdoor unit 11. When a temperature setting (e.g., as desired by a user) pertaining to an environment within the building 2 of a thermostat coupled to the heat pump control logic 27 signals the compressor 13 to start, the automatic control system 6 is configured to receive an ON signal from a compressor start sensor 18 (also referred to herein as a "heat pump system compressor ON/OFF sensor") coupled to compressor control logic within the heat pump control logic 27, and, if water located in the water reservoir 1 has sufficient cooling capacity and/or is below a predetermined (e.g., as determined by a user setting) water temperature (e.g., as determined via the automatic control system 6, which may be configured to measure the water reservoir 1 temperature with a water temperature sensor 19, which may be located somewhere within the water recirculation system and is coupled to the automatic control system 6), the automatic control system 6 is configured to send a command signal to the control actuator of the 3-way valve 8 to divert the water in the water recirculation loop to pass through the water heat exchanger 5, and, if necessary, activates (e.g., turns on) and/or changes the speed of the water reservoir water pump 4. A consequence of the foregoing is the water then passes through the water heat exchanger 5 and cools the heated refrigerant gas (i.e., heat energy stored within the refrigerant gas transfers from the refrigerant to the water within the water heat exchanger 5).

Furthermore, the automatic control system 6 may be configured to measure the temperature of the refrigerant exiting from the water heat exchanger 5 (which will then pass through the coils of the outdoor unit 11) with an appropriately positioned temperature sensor 17 coupled to the automatic control system 6, and, if such a measured temperature is sufficiently cold enough (e.g., as determined by a user setting via the automatic control system 6), and the water flow sensor 20 water heat exchanger 5 indicates a sufficient predetermined threshold (e.g., as user defined via the automatic control system 6) water flow rate, the automatic control system 6 may be configured to turn off the condenser coils fan 10 of the outdoor unit 11 to prevent the refrigerant passing there through from warming by obtaining heat transferred from the outdoor ambient air (which may result in a beneficial energy consumption optimization of the heat pump system/building). The now heated water exiting from the water heat exchanger 5 is then returned (e.g., by piping) to the water reservoir 1.

Upon completion of the cooling cycle (e.g., either the heat pump system 3 is manually turned off or loses power, or the building thermostat indicates to the heat pump control logic 27 that a desired set temperature (e.g., by a user) has been achieved), the automatic control system 6 is configured to receive an OFF signal from the sensor 18 (indicating that the compressor 13 is no longer operating (i.e., powered OFF)), and divert water from continuing to pass through the water heat exchanger 5 by sending a command signal to the control actuator of the 3-way valve 8 (resulting in the water returning to the water reservoir 1 and not passing through the water heat exchanger 5), and, if necessary, turn off or change the speed (e.g., decrease) of the water reservoir water pump 4.

Note that embodiments of the present invention are not limited to monitoring a thermostat physically located within an environment within the building 2, but could also be configured to receive signals, indicating a desired temperature setting for an environment within a building 2, from any remote control system configured to control the temperature within such an environment, whether the remote control system is located within the building 2 or not.

FIG. 3 illustrates a schematic block diagram of the system of FIG. 1 operating in a heating mode in accordance with embodiments of the present invention. As will be described hereinafter and with respect to FIG. 5 (described below), operation of embodiments of the present invention may be performed in accordance with algorithms configured to run within the automatic control system 6.

In this heating mode, the outdoor unit 11 of the heat pump system 3 is operating its coils as an evaporator, while the indoor unit 9 (which may be physically located somewhere within the building 2) is operating its coils as a condenser. The reversing valve 12 and associated conduits are configured to operate in such a heating mode so that the cold refrigerant liquid exiting from the expansion valve 14 first passes through the evaporator coils of the outdoor unit 11 and then passes through the water heat exchanger 5. When a thermostat temperature setting pertaining to an environment within the building 2 (e.g., as set by a user) causes the heat pump control logic 27 to signal the compressor 13 to stark (i.e., power ON), the automatic control system 6 is configured to receive an ON signal from the compressor start sensor 18, and, if the water temperature in the water reservoir 1 is above a predetermined (e.g., as determined by a user setting via the automatic control system 6) heat pump heating balance point (as controlled by the automatic control system 6 measuring the water temperature of the water reservoir 1 with the water temperature sensor 19), and the outdoor ambient air temperature (e.g., as measured by an outdoor temperature sensor 16 coupled to the automatic control system 6) is below the water temperature (e.g., as measured by the water temperature sensor 19), the automatic control system 6 is configured to send a command signal to the control actuator of the 3-way valve 8 to divert water within the water recirculation loop to pass through the heat exchanger 5 (see the Heat pump flow—warm water in path in FIG. 3), and activate (e.g., turn on) the water pump 4 (or may alter its speed (e.g., increase); for example, see FIGS. 7-8). As a consequence, the water passing through the heat exchanger 5 warms the cold refrigerant liquid (i.e., heat energy transfers from the water to be captured by the refrigerant). If the water flow sensor 20 indicates a sufficient predetermined threshold (e.g., as determined by a user setting via the automatic control system 6) water flow rate, the automatic control system 6 may be configured to turn off the fan 10 of the outdoor unit evaporator 11 to prevent cooling of the refrigerant flowing in the coils therein from the outdoor air (which may result in an added benefit of energy consumption optimization for heat pump system/ building). The now colder water exiting from the water heat exchanger 5 returns through appropriately positioned conduits to the water reservoir 1.

When the heating cycle is completed (e.g., either the heat pump system 3 is manually turned off or loses power, or the building thermostat indicates to the heat pump control logic 27 that a desired set temperature (e.g., user defined) has been achieved), the automatic control system 6 is configured to receive an OFF signal from the sensor 18, and then divert water from no longer passing through the water heat exchanger 5 by sending a command signal to the control actuator of the 3-way valve 8 (resulting in the water returning to the water reservoir 1 and not passing through the water heat exchanger 5), and, if necessary, deactivate (e.g., turn off), or change a speed of, the water pump 4.

Figure 4:
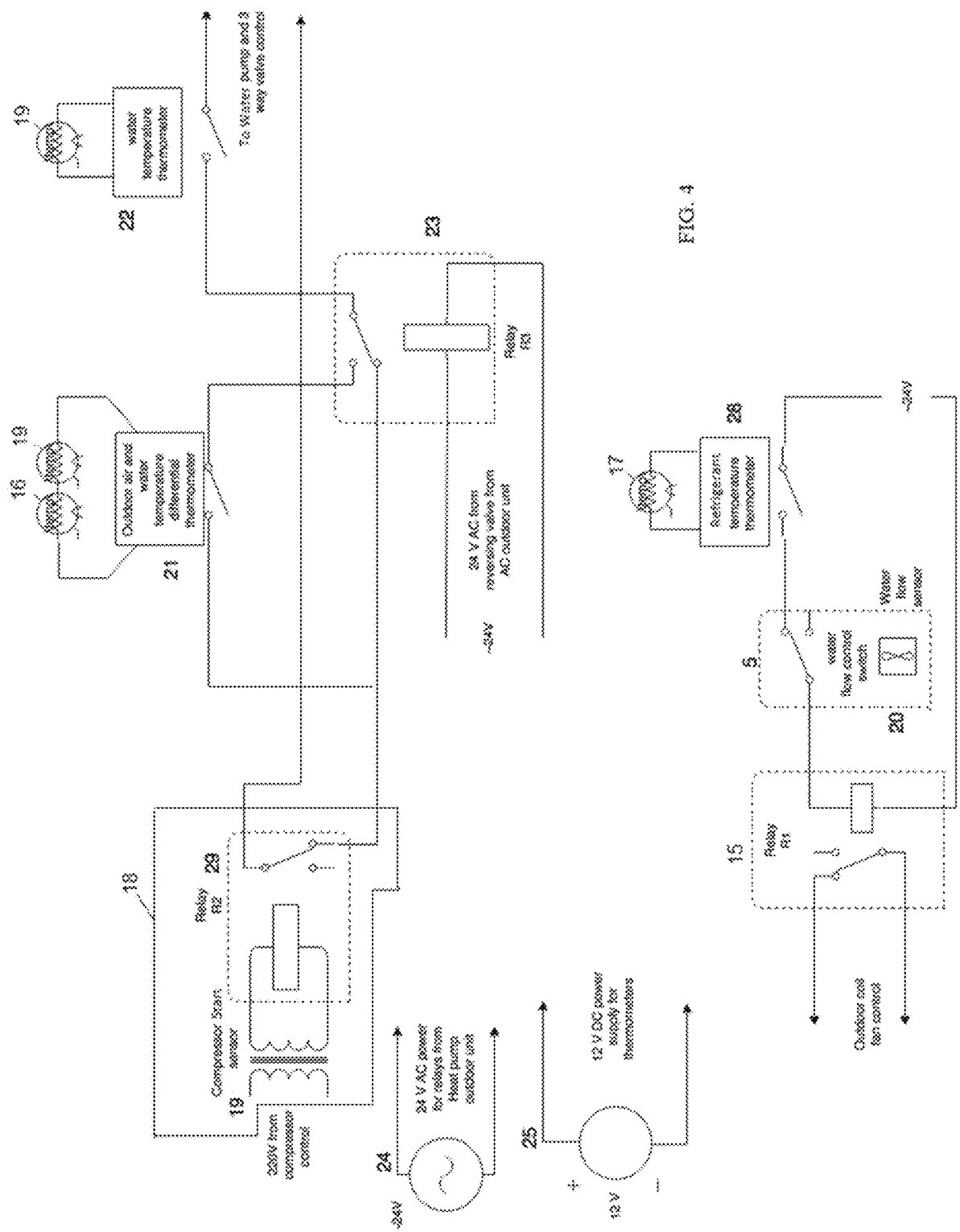
FIG. 4 illustrates schematic circuit diagrams of elements implemented with respect to an automatic control system in accordance with embodiments of the present invention.
Figure 5:
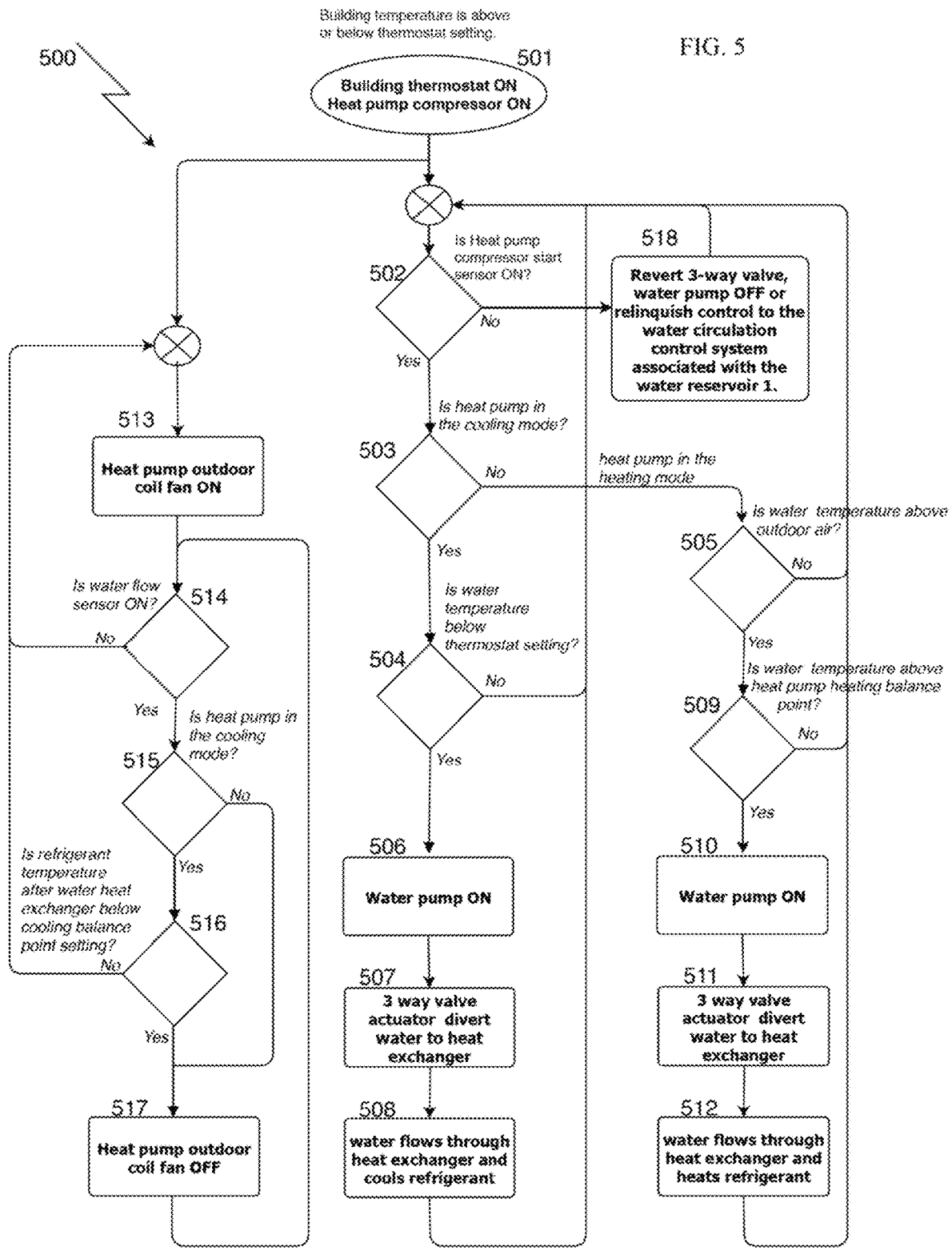
FIG. 5 illustrates a process block diagram of elements implemented with respect to an automatic control system in accordance with embodiments of the present invention.

FIG. 4 illustrates schematic circuit diagrams of elements implemented with respect to the automatic control system 6 in accordance with embodiments of the present invention, which include various sensors and control logic (as further described with respect to FIG. 5). In accordance with embodiments of the present invention, various ones of such elements maybe co-located with the automatic control system 6 or elsewhere as appropriate. Furthermore, the various elements, such as sensors and control circuits, described herein with respect to FIGS. 2-4 and 7 may be implemented to communicate with the automatic control system 6 via a wireless network, such as a Bluetooth communication network, including Bluetooth-Low Energy. The automatic control system 6 and associated elements may be configured to include:

1) Water pump and 3-way valve actuator control circuitry: The compressor start sensor 18 may be configured with a transformer 19 (e.g., 220V AC to 24V AC) and a relay circuit (R2) 29. The transformer 19 may be coupled to the compressor control logic (which is configured to control starting and stopping of operation of the compressor 13) within the heat pump control logic 27. When power to the compressor 13 (i.e., compressor is ON) is sensed by the compressor start sensor 18 (e.g., by sensing a 220V AC power signal applied by the compressor control logic to the compressor 13), the relay circuit (R2) 29 contacts close (as powered by the transformer 19), producing the aforementioned (e.g., see the discussion relative to FIGS. 2 and 3) ON signal (e.g., a 24V AC signal from the transformer 19) received by the automatic control system 6 from the sensor 18. In order to determine if the heat pump system 3 is operating in a heating or cooling mode, a heat pump mode sensor 23 (also referred to herein as the "heat pump system reversing valve position sensor") may be implemented with a relay circuit R3 coupled to reversing valve logic of the heat pump control logic 27, which is responsible for controlling operation of the reversing valve 12 (e.g., the relay circuit R3 may be configured to sense a 24V AC control power signal (configured to control operation of the reversing valve 12) delivered from the reversing valve logic to the reversing valve 12). Depending on the heat pump operating mode (heating or cooling cycle), such a control power signal delivered to the reversing valve 12 will indicate whether the heat pump system 3 is operating in either a heating or cooling mode. Because of that, use of either a normal close or normal open contact may be utilized (as desired) for the relay circuit R3 of the heat pump mode sensor 23. In the cooling mode, when the compressor 13 starts operating (i.e., powered ON), the sensor 18 is activated, and the relay circuit R3 of the heat pump mode sensor 23 will connect the relay (R2) 29 contacts to the relay contacts of the water reservoir temperature thermometer 22, which is coupled to the water temperature sensor 19. If the water reservoir temperature is below a predetermined thermostat setting point (e.g., as determined by a user setting via the automatic control system 6), the relay circuit contacts of the water reservoir temperature thermostat 22 will close so that a control circuit associated with the water pump and 3-way valve actuator is closed, resulting in the water being directed through the water heat exchanger 5. In other words, the automatic control system 6 may be configured to send control signals to the water pump 4 by closing such a control circuit to turn on the water pump 4 (if it is not yet turned on), and to the control actuator of the 3-way valve 8 to actuate the 3-way valve 8 so that water is now diverted to the water heat exchanger 5. In the heating mode, when the compressor start sensor 18 is activated (e.g., the compressor 13 is powered ON), the relay circuit R3 will connect the relay (R2) 29 contacts to the relay contacts of the outdoor air and water temperature differential thermometer 21, which is coupled to the water temperature sensor 19 and the outdoor air temperature sensor 16. If the water temperature is above the outdoor ambient air temperature, the relay contacts of the temperature differential thermometer 21 will close, and the control circuit associated with the water pump and 3-way valve actuator is closed, resulting in water being directed through the water heat exchanger 5. If the water temperature drops below a predetermined heat pump heating balance point (e.g., as determined by a user setting via the automatic control system 6), the thermometer 22 is configured to open its relay contacts resulting in water no longer flowing through the water heat exchanger 5. In other words, the automatic control system 6 may be configured to send control signals to the control actuator of the 3-way valve 8 to actuate the 3-way valve 8 so that water is no longer diverted to the water heat exchanger 5 (and may also be configured to turn off the water pump 4 or relinquish control of the water pump 4 to the water recirculation system control system). In such an instance, it may also be determined (e.g., by the heat pump system 3 or the automatic control system 6) that the heat pump system 3 does not have the capacity to generate enough heating energy to heat the environment(s) in the building, and the heat pump control logic 27 may be configured to turn on a conventional auxiliary heater (not shown). Thus, the heat pump compressor 13 may be turned off by the heat pump control logic 27. Once the temperature of the water in the water reservoir 1 increases above a predetermined heat pump heating balance point (e.g., as predetermined by a user setting via the automatic control system 6), the water temperature thermometer 22 may be configured to close its relay contacts, and water will start flowing through the water heat exchanger 5 again, as previously described.

2) Heat pump outdoor coil fan control circuitry: In accordance with embodiments of the present invention, to decrease system power consumption and prevent unwanted refrigerant cooling or heating by outdoor ambient air, when the system is operating in a water-to-refrigerant heat exchange mode, the system may be configured with a breaker relay circuit (R1) 15 coupled to the coil fan 10 of the outdoor unit 11 (i.e., the fan configured to flow air past the coils of the outdoor unit 11). The contacts of this relay circuit R1 may be set as normal closed, and configured to open to break the heat pump fan control power circuit (i.e., turn off the fan 10) when two conditions are met: the water flow sensor 20 contacts of the water heat exchanger 5 are closed (meaning that a predetermined amount of water is flowing through the heat exchanger 5) and relay circuit contacts associated with the refrigerant temperature thermometer 28 are closed as well. In accordance with embodiments of the present invention, the refrigerant temperature sensor 17, which measures the refrigerant temperature, may be mounted on the refrigerant output line exiting from the water heat exchanger 5. If the refrigerant temperature is below a predetermined threshold heat pump cooling balance point (e.g., as predetermined by a user setting via the automatic control system 6), relay circuit contacts associated with the thermometer 28 may be configured to close. When all relay circuit contact groups are closed, the relay circuit R1 of the coil fan breaker 15 is powered to leave the fan 10 powered on, and when the relay circuit contacts are open, it opens the heat pump fan control power circuit to turn off power to the fan 10. If any of the described above conditions are not met, the heat pump fan control power circuit may be reinstated resulting in the outdoor coil fan 10 operating normally. This circuitry may also be configured to protect the heat pump compressor 13 from overheating in case of a failure of the water pump 4 or other water flow problems. If the automatic control system 6 closes the water pump and 3-way valve actuator control circuit, but because for any reason, water does not flow, the heat pump outdoor coil fan 10 may also be configured to run normally. If the water is warn, but still below a predetermined water temperature thermostat setting (e.g., as predetermined by a user setting via the automatic control system 6), it may not have enough cooling power, and a temperature of the refrigerant exiting from the water heat exchanger 5 will increase. The automatic control system 6 may be configured to the open relay circuit contacts of the refrigerant temperature thermometer 28, resulting in the heat pump outdoor coil fan 10 being caused to run normally in order to cool the refrigerant with the air-to-refrigerant heat exchanger 11 in addition to the water heat exchanger 5. In accordance with embodiments of the present invention, in the heating mode, the temperature of the refrigerant exiting from the water heat exchanger 5 may always be below the predetermined cooling balance point, and thus this circuitry may be irrelevant in such circumstances.

3) Power supplies: In accordance with embodiments of the present invention, power supplies may be configured to provide desired (e.g., low) voltages to operate the aforementioned thermometers and control logic.

4) in accordance with embodiments of the present invention, the automatic control system logic 6 may be configured to operate in accordance with system and/or processes as further described with respect to FIGS. 5, 7, and 8.

FIG. 5 illustrates a system and/or process 500 configured in accordance with embodiments of the present invention. At the beginning of the system/process 500, a temperature of an environment inside of the building 2 will either be above or below a thermostat setting (e.g., as stored within the heat pump control logic 27), for example, as determined by a person within the building 2 or even via a remote system coupled to the heat pump system 3. In the process block 501, the thermostat will be activated as a function of such a thermostat setting. As a result of the activation of the thermostat, a signal is sent to activate (e.g., power ON) the compressor 13 of the heat pump system 3. Additionally, the heat pump control logic will turn on the outdoor coil fan 10 of the heat pump system 3 (see the process block 513). In the process block 502, the automatic control system 6 determines if a compressor start sensor 18 is signaling that the compressor 13 has been powered ON. If it is determined that a compressor start sensor 18 is signaling that the compressor 13 has been powered ON, the system/process 500 proceeds to the process block 503.

In the process block 503, a determination is made by the automatic control system 6 via the heat, pump erode sensor 23 (see FIG. 4) whether the heat pump system 3 is in a cooling mode. If the process block 503 determines that the heat pump is in a cooling mode, the system/process 500 will proceed to the process block 504 to determine by the automatic control system 6 if the water temperature of the water reservoir 1 is below a predetermined water reservoir thermostat setting (e.g., as determined by a user setting via the automatic control system 6), as measured by the water temperature sensor 19 coupled to the automatic control system 6. If the water temperature of the water reservoir 1 is below a predetermined water reservoir thermostat setting, then the system/process 500 will proceed to the process block 506 to turn on the water pump 4. For example, the automatic control system 6 may consequently send an appropriately configured signal to the control circuitry of the water pump 4 for turning on the water pump 4 (e.g., by the automatic control system 6 transmitting signals (e.g., wired or wirelessly) to a controller of the water pump 4). Additionally, in the process block 507, the automatic control system 6 may be configured to send a signal to the control actuator of the 3-way valve 8 to divert water from returning to the water reservoir 1, and instead to flow through the water heat exchanger 5. In the process block 508, this flow of water from the water reservoir 1 will then flow through the water heat exchanger 5 to thereby cool the refrigerant flowing through the water heat exchanger 5 as a result of a heat transfer between the water received from the water reservoir 1 and the refrigerant flowing within the water heat exchanger 5. The result of the process block 508 is that the refrigerant is thereby cooled, which is utilized by the heat pump system 3 to cool down the environment within the building 2.

Returning to the process block 503, if the automatic control system 6 has determined via the heat pump mode sensor 23 that the heat pump system 3 is not in a cooling mode, but is instead in a heating mode, then the system/process 500 proceeds to the process block 505 to determine whether the temperature of the water in the water reservoir 1 is above the temperature of the outdoor ambient air. As previously described, the water temperature may be measured by the water temperature sensor 19, and the outdoor air temperature may be measured by the outdoor temperature sensor 16, which are both coupled to the temperature differential thermometer 21 coupled to the automatic control system 6. If it is determined in the process block 505 that the water temperature of the water in the water reservoir 1 is not above the temperature of the outdoor ambient air, then the system/process 500 returns to the process block 502. For example, the relay circuit contacts associated with the temperature differential thermometer 21 of FIG. 4 remain open. However, if it is determined in the process block 505 that the water temperature of the water in the water reservoir 1 is above the temperature of the outdoor air, then the system/process 500 will proceed to the process block 509 to determine whether the temperature of the water in the water reservoir 1 is above the predetermined heat pump heating balance point (e.g., by sensing the water temperature with the water temperature sensor 19). If not, then the system/process 500 returns to the process block 502. For example, the relay circuit contacts associated with the water temperature thermometer 22 of FIG. 4 remain open.

However, if it is determined that the water temperature is above the temperature of the outdoor air (see the process block 505), and the temperature of the water in the water reservoir 1 is above the heat pump heating balance point, then the system/process 500 proceeds to the process block 510 to turn on the water pump 4. For example, the relay contacts associated with the water temperature thermometer 22 and the temperature differential thermometer 21 are both closed. Then, in the process block 511, the automatic control system 6 is configured to signal the control actuator of the 3-way valve 8 to cause the 3-way valve 8 to divert water to the water heat exchanger 5. In the process block 512, the water now flowing through the water heat exchanger 5 exchanges heat energy with the refrigerant in the water heat exchanger 5 to thereby increase the temperature of the refrigerant. This results in the heated refrigerant utilized by the heat pump system 3 to thereby heat the environment within the building 2.

Note that, in accordance with embodiments of the present invention, a water circulation system of the water reservoir may already have its water pump turned on when the system/process 500 proceeds to either of the process blocks 506 or 510. As a result, the system/process 500 may first determine whether the water pump 4 is already activated via a water pump signal from the water circulation system), and if the water pump 4 has not yet been activated, then the automatic control system 6 may be configured to send an activation signal to the water circulation system to activate the water pump 4.

In accordance with certain embodiments of the present invention, the system/process 500 may return to the process block 502 from the process blocks 508 and/or 512. As previously disclosed, the process block 502 is configured to determine whether a signal from the compressor start sensor 18 is still ON, meaning that the compressor 13 is continuing to operate (i.e., the heat pump system 3 is still in a cooling or heating mode because a temperature in an environment in the building 2 has not yet reached the temperature set by the thermostat setting). If the process block 502 determines that a signal from the compressor start sensor 18 is OFF (e.g., as a result of the temperature in the environment in the building 2 reaching the thermostat setting, or the heat pump system 3 having been turned off or losing power), the system/process 500 proceeds to the process block 518, which is configured to signal the 3-way valve 8 to no longer divert water to the water heat exchanger 5 (i.e., so that the water is reverted back to the water reservoir 1), and may also be configured to turn off the water pump 4, or alternatively may grant control of the water pump 4 to another system (e.g., the control circuitry of the water pump 4 associated with the water recirculation system of the water reservoir 1 (e.g., a swimming pool or spa controller)). Then, the system/process 500 returns to the process block 502.

As previously described, when the heat pump compressor 13 is powered ON, the heat pump coil fan 10 may also be turned on. In process block 514, a determination is made by the automatic control system 6 whether the water flow sensor 20 indicates that there is a sufficient predetermined flow rate of water through the water heat exchanger 5. If not, then the system/process 500 continues to run the outdoor coil fan 10 in the process block 513. Note that this is what may occur for the NO paths exiting from the process blocks 504, 505, and 509 and returning to the process block 502, since these paths result in water from the water reservoir not being diverted through the water heat exchanger 5.

However, if there is a sufficient flow rate of water through the water heat exchanger 5 as sensed by the water flow sensor 20 (for example, this may be case when the water pump 4 has been turned on; see the process blocks 508 and 512), the automatic control system 6 is then configured to proceed to the process block 515 to determine whether the heat pump system 3 is in a cooling or heating mode. If, in the process block 515, it is determined that the heat pump system 3 is in a cooling mode, then the system/process 500 proceeds to the process block 516 to determine if the temperature of the refrigerant exiting from the water heat exchanger 5 (e.g., as sensed by the refrigerant temperature sensor 17) is below a predetermined cooling balance point setting (e.g., as determined by a user setting via the automatic control system 6). If not, then the system/process 500 returns to the process block 513 to continue to run the outdoor coil fan 10 (e.g., the relay circuit contacts of the refrigerant temperature thermometer 28 remain closed). However, if the refrigerant temperature of the water exiting the water heat exchanger 5 is below a cooling balance point setting as measured by the refrigerant temperature sensor 17, the system/process 500 proceeds to the process block 517 to turn off the outdoor coil fan 10 (e.g., by opening the relay circuit contacts of the refrigerant temperature thermometer 28). If the process block 515 determines that heat pump system 3 is not in a cooling mode (e.g., it is in a heating mode), the system/process 500 proceeds to the process block 517 to turn off the outdoor coil fan 10 (e.g., by opening the relay circuit contacts of the refrigerant temperature thermometer 28, or by sending a signal from automatic control system 6 to the heat pump control logic 27). After turning off the outdoor coil fan 10 in the process block 517, the system/process 500 returns to the process block 514.

As can be seen by referring to FIGS. 2 and 5, if the heat pump system 3 is in a cooling mode for attempting to cool the environment within the building 2, and if the temperature of the water in the water reservoir 1 has sufficient cooling capacity as determined by the predetermined thermostat setting of the water temperature sensor 19, embodiments of the present invention will utilize the water from the water reservoir 1 in combination with the outdoor coil fan 10 of the heat pump system 3 to cool the refrigerant of the heat pump system 3 to thereby cool an environment within the building 2. But, if the temperature of the water in the water reservoir 1 is sufficiently cool enough to continue to exchange heat with the refrigerant in the water heat exchanger 5 to cool the environment within the building 2 by itself, the automatic control system 6 is configured to turn off the outdoor coil fan 10. A result is that the entire system is more energy efficient by not utilizing electricity to operate the fan 10.

Note that in accordance with certain embodiments of the present invention, the water pump 4 may be a conventional 1 or 2 speed water pump, or a variable speed water pump. In such situations where the water pump 4 is operable at more than one speed, or at variable speeds, there may be certain speed(s) that are satisfactory for normal water recirculation within the water reservoir (e.g., for satisfactory operation of a residential swimming pool or spa), but which are not satisfactory for pumping the water when diverted by the 3-way valve 8 to pass through the water heat exchanger 5. As a result, the water pump control system for determining the speeds of the water pump 4 may be reconfigured to give priority to controls received from the automatic control system 6. Thus, when the water pump 4 control system receives command signals from the automatic control system 6 to change the speed of the water pump 4, such command signals will override any previous control signals received from the water recirculation system of the water reservoir.

FIG. 7 illustrates a water heat exchanger water flow optimization controller 30, configured in accordance with certain embodiments of the present invention, which may be implemented for use with a water reservoir employing a water pump having more than one operating speed. Operation of the controller 30 may be performed in accordance with the system/process 800 illustrated in FIG. 8, and may be implemented in the automatic control system 6. The controller 30 has a control port 31, which may be coupled to the control circuitry of the variable speed water pump 4 to control the pump speed. Once the controller 30 receives a command from either the process blocks 506 or 510 (e.g., the automatic control system 6 has closed the water pump and 3-way valve actuator control circuit see (FIG. 4)), the controller 30 is configured to send a command signal to the control circuitry of the variable speed water pump 4 to operate the water pump 4 at a preselected (e.g., as determined by a user setting) speed (e.g., some speed between its slowest and fastest rates, e.g., a selected median speed) through the variable speed pump speed control port 31, and then the controller 30 is configured to read the temperature of the water of the water reservoir 1 via the water temperature sensor 19 (which is about the same as the water temperature arriving at the input of the water heat exchanger 5), and via the water temperature sensor 29 measuring the temperature of the water exiting from the output of the water heat exchanger 5. If a gradient between the water temperatures measured via the two sensors 19 and 29 falls within a predetermined range (e.g., as determined by a user setting), the controller 30 is configured to maintain this preselected pump speed. If the gradient falls outside of the predetermined range, the controller 30 is configured to increase or decrease the water pump speed, depending on the gradient position, as described hereinafter.

FIG. 8 further illustrates a system/process 800 that may be implemented within the controller 30 in accordance with embodiments of the present invention. At the beginning of the system/process 800, the controller 30 receives a command to start, the variable speed water pump 4 from either the process blocks 506 or 510, and sets the variable speed water pump 4 to a preselected speed (e.g., the aforementioned median speed) in the process block 801. Next, the process block 802 determines if the temperature gradient as measured by the water temperature sensor 19 and the water temperature sensor 29 falls within the predetermined range. If the measured gradient of water temperature falls within the predetermined range, the system/process 800 proceeds to the process block 804 to maintain that preselected pump speed. If in the process block 802, the gradient falls outside of the predetermined range, the system/process 800 proceeds to the process block 803 to determine if the water temperature gradient is below the predetermined range. If yes, the system/process 800 proceeds to the process block 805 to decrease the speed of the variable speed water pump 4 by a predetermined (e.g., a user defined) increment. Accordingly, the rate of water flow through the water heat exchanger 5 decreases, resulting in a greater rate of heat transferring to a same amount of water flowing through the water heat exchanger 5 during a certain time period, which results in an increase in the temperature of the water exiting from the water heat exchanger 5. If in the process block 803 it is determined that the water temperature gradient is above the predetermined range, the system/process 800 proceeds to the process block 806 to increase the speed of the variable speed water pump 4 by a predetermined (e.g., a user defined) increment. Accordingly, the rate of water flow through the water heat exchanger 5 increases, resulting in a lesser rate of heat transferring to a same amount of water flowing through the water heat exchanger 5 during a certain time period, which results in a decrease in the temperature of the water exiting from the water heat exchanger 5. After the process blocks 805 and 806, the system/process 800 returns to the process block 802.

As has been described herein, embodiments of the present invention may be implemented to perform the various functions described in FIGS. 1-5. In accordance with embodiments of the present invention, such functionalities may be implemented within hardware and/or software, such as within one or more data processing systems (e.g., the data processing system 600 of FIG. 6 described herein), implemented within the automatic control system 6. Nevertheless, the functionalities described herein are not to be limited for implementation into any particular hardware/software platform. As will be appreciated by one skilled in the art, aspects of the present invention may be embodied as a system, method, and/or program product. Accordingly, aspects of the present invention may take the form of an entirely hardware embodiment, an entirely software embodiment (including firmware, resident software, micro-code, etc.), or embodiments combining software and hardware aspects that may all generally be referred to herein as a "circuit," "circuitry," "module," or "system." Furthermore, aspects of the present invention may take the form of a program product embodied in one or more computer readable storage medium(s) having computer readable program code embodied thereon. (However, any combination of one or more computer readable medium(s) may be utilized. The computer readable medium may be a computer readable signal medium or a computer readable storage medium.)

A computer readable storage medium may be, for example, but not limited to, an electronic, magnetic, optical, electromagnetic, infrared, biologic, atomic, or semiconductor system, apparatus, controller, or device, or any suitable combination of the foregoing, wherein the computer readable storage medium is not a transitory signal per se. More specific examples (a non-exhaustive list) of the computer readable storage medium may include the following: an electrical connection having one or more wires, a portable computer diskette, a hard disk, a random access memory ("RAM") (e.g., RAM 620 of FIG. 6), a read-only memory ("ROM") (e.g., ROM 635 of FIG. 6), an erasable programmable read-only memory ("EPROM" or flash memory), an optical fiber, a portable compact disc read-only memory ("CD-ROM"), an optical storage device, a magnetic storage device (e.g., hard drive 631 of FIG. 6), or any suitable combination of the foregoing. In the context of this document, a computer readable storage medium may be any tangible medium that can contain or store a program or set of instructions for use by or in connection with an instruction execution system, apparatus, controller, circuitry, or any other electronic device. Program code embodied on a computer readable signal medium may be transmitted using any appropriate medium, including but not limited to wireless, wire line, optical fiber cable, RF, etc., or any suitable combination of the foregoing.

The process block and schematic diagrams in the figures illustrate architecture, functionality, and operation of possible implementations of systems, methods, processes, and program products configured according to various embodiments of the present invention. In this regard, each block in the process block or schematic diagrams may represent a module, segment, or portion of code, which includes one or more executable program instructions for implementing the specified logical function(s). It should also be noted that, in some implementations, the functions noted in the blocks may occur out of the order noted in the figures. For example, two blocks shown in succession may, in fact, be executed substantially concurrently, or the blocks may sometimes be executed in the reverse order, depending upon the functionality involved.

These program instructions may be provided to a processor and/or controller of a general purpose computer, special purpose computer, or other programmable data processing apparatus (e.g., a controller) to produce a machine, such that the instructions, which execute via the processor of the computer or other programmable data processing apparatus, create means for implementing the functions/acts specified in the process block and/or schematic diagram block or blocks.

It will also be noted that each block of the schematic diagrams and/or process block illustrations, and combinations of blocks in the schematic diagrams and/or process block illustrations, can be implemented by special purpose hardware-based systems that perform the specified functions or acts, or combinations of special purpose hardware and computer instructions. For example, a module may be implemented as a hardware circuit including custom VLSI circuits or gate arrays, off-the-shelf semiconductors such as logic chips, transistors, controllers, transformers, relays, sensors, thermostats, or other discrete components. A module may also be implemented in programmable hardware devices such as field programmable gate arrays, programmable array logic, programmable logic devices, or the like.

Computer program code, i.e., instructions, for carrying out operations for aspects of the present invention may be written in any combination of one or more programming languages, including an object-oriented programming language such as Java, Smalltalk, C++ or the like and conventional procedural programming languages, such as the "C" programming language or similar programming languages.

These program instructions may also be stored in a computer readable storage medium that can direct a computer, other programmable data processing apparatus, controller, or other devices to function in a particular manner, such that the instructions stored in the computer readable medium produce an article of manufacture including instructions which implement the function/act specified in the process block and/or schematic diagram block or blocks. The program instructions may also be loaded onto a computer, other programmable data processing apparatus, controller, or other devices to cause a series of operational steps to be performed on the computer, other programmable apparatus or other devices to produce a computer implemented process such that the instructions which execute on the computer or other programmable apparatus provide processes for implementing the functions/acts specified in the process block and/or schematic diagram block or blocks.

Reference is made herein to configuring a device, or a device configured to perform some function. It should be understood that this may include selecting predefined logic blocks and logically associating them, such that they provide particular logic functions, which includes monitoring or control functions. It may also include programming computer software-based logic of a retrofit control device, wiring discrete hardware components, or a combination of any or all of the foregoing.

Figure 6:
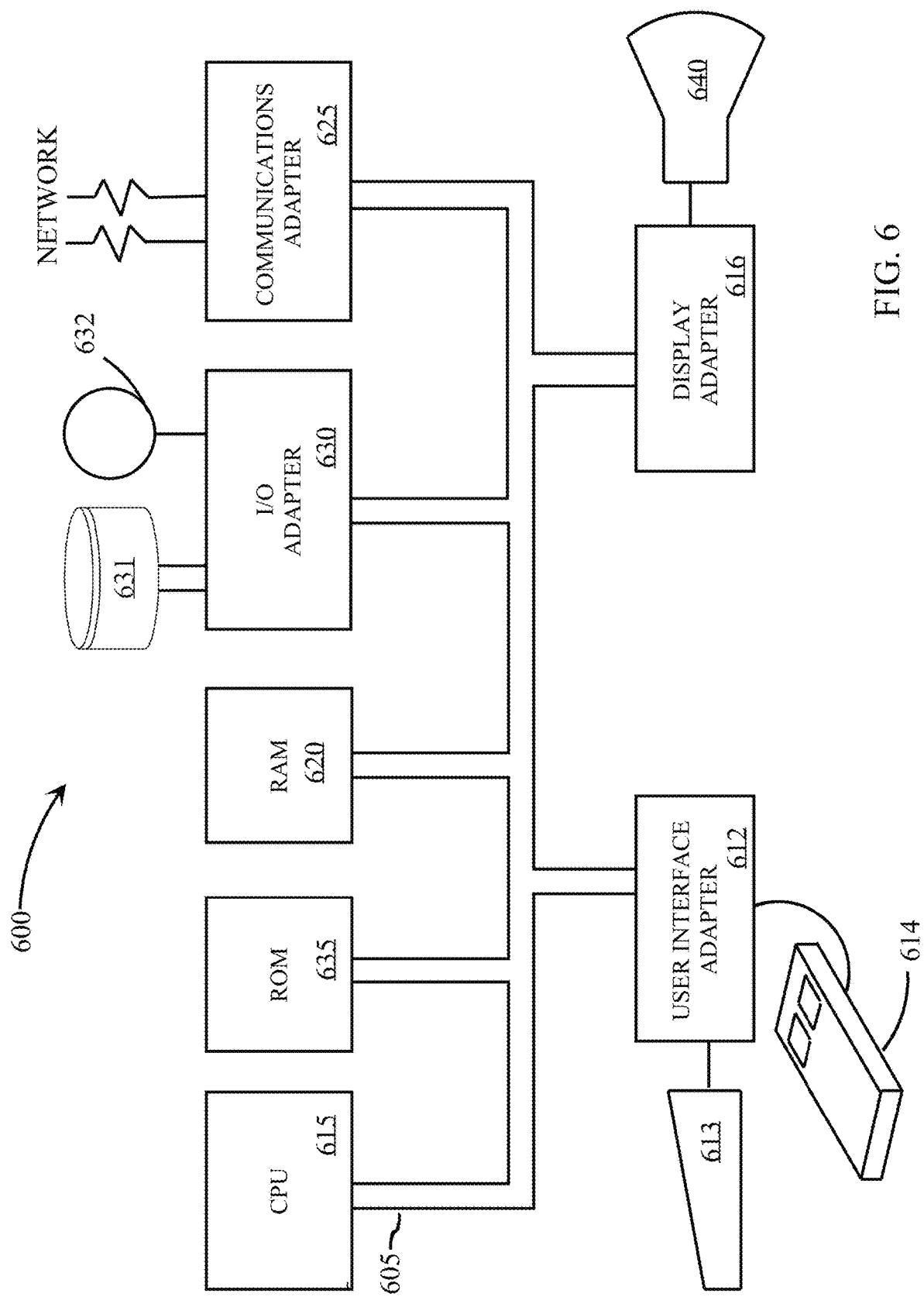
FIG. 6 illustrates a block diagram of a data processing system configured in accordance with embodiments of the present invention.

With reference now to FIG. 6, a block diagram illustrating a data processing ("computer") system 600 is depicted in which aspects of embodiments of the invention may be implemented. At least some aspects of the automatic control system 6 may be configured to be operated by the computer system 600. The computer system 600 may employ a peripheral component interconnect ("PCI") local bus architecture. Although the depicted example employs a PCI bus, other bus architectures such as Accelerated Graphics Port ("AGP") and industry Standard Architecture ("ISA") may be used, among others. Processor ("CPU") 615, volatile memory 620, and non-volatile memory 635 may be connected to PCI local bus 605 through PCI Bridge (not shown). In the depicted example, a communication (e.g., network ("LAN") and/or Bluetooth) adapter 625, an I/O (e.g., small computer system interface ("SCSI") host bus) adapter 630, and expansion bus interface (not shown) may be connected to PCI local bus 605 by direct component connection. An audio adapter (not shown), a graphics adapter (not shown), and a display adapter 616 (coupled to a display 640) may be connected to the PCI local bus 605 (e.g., by add-in boards inserted into expansion slots).

The user interface adapter 612 may be suitable to provide a connection for a keyboard 613 and a mouse 614, modem (not shown), and additional memory (not shown). The I/O adapter 630 may be suitable to provide a connection for a hard disk drive 631, a tape drive 632, and/or CD-ROM drive (not shown).

An operating system may be run on processor 615 and used to coordinate and provide control of various components within the computer system 600. In FIG. 6, the operating system may be a commercially available operating system. An object-oriented programming system such as Java may run in conjunction with the operating system and provide calls to the operating system from Java programs or programs executing on the system 600. Instructions for the operating system, the object-oriented operating system, and programs may be located on non-volatile memory 635 storage devices, such as a hard disk drive 631, and may be loaded into volatile memory 620 for execution by the processor 615.

Those of ordinary skill in the art will appreciate that the hardware in FIG. 6 may be configured to vary depending on the implementation. Other internal hardware or peripheral devices, such as flash ROM (or equivalent nonvolatile memory) or optical disk drives and the like, may be used in addition to or in place of the hardware depicted in FIG. 6. Also, various processes of the present invention may be applied to a multiprocessor computer system.

As another example, the computer system 600 may be configured as a stand-alone system configured to be bootable without relying on some type of network communication interface, whether or not the computer system 600 includes some type of network communication interface. As a further example, the computer system 600 may be configured as an embedded controller, which is configured with ROM and/or flash ROM providing non-volatile memory storing operating system files or user-generated data.

The depicted example in FIG. 6 and above-described examples are not meant to imply architectural limitations. Further, a computer program form of various aspects of the present invention may reside on any computer readable storage medium (i.e., floppy disk, compact disk, hard disk, tape, ROM, RAM, etc.) used by a computer system. (The terms "computer," "system," "computer system," and "data processing system" may be used interchangeably herein.)

Though embodiments of the present invention are described herein to be operated under control of the automatic control system 6, the present invention is not limited to such a control system being wholly operable in an automatic manner (without manual intervention by a user), but some aspects, or all, may be manually performed by a user, e.g., utilizing manual input controls (e.g., via a graphical user interface ("GUI") on a display (e.g., the display 640 and/or the mouse 614), or a keyboard input mechanism (e.g., the keyboard 613), or some other input mechanism.

Reference throughout this specification to "an embodiment," "embodiments," or similar language means that a particular feature, structure, or characteristic described in connection with the embodiments is included in at least one embodiment of the present invention. Thus, appearances of the phrases "in one embodiment," "in an embodiment," "embodiments," "certain embodiments," "various embodiments," and similar language throughout this specification may, but do not necessarily, all refer to the same embodiment. Furthermore, the described features, structures, aspects, and/or characteristics of the invention may be combined in any suitable manner in one or more embodiments. Correspondingly, even if features may be initially claimed as acting in certain combinations, one or more features from a claimed combination can in some cases be excised from the combination, and the claimed combination can be directed to a sub-combination or variation of a sub-combination.

Benefits, advantages, and solutions to problems have been described above with regard to specific embodiments. However, the benefits, advantages, solutions to problems, and any element(s) that may cause any benefit, advantage, or solution to occur or become more pronounced may be not to be construed as critical, required, or essential features or elements of any or all the claims. Further, no component described herein is required for the practice of the invention unless expressly described as essential or critical.

Those skilled in the art having read this disclosure will recognize that changes and modifications may be made to the embodiments without departing from the scope of the present invention. It should be appreciated that the particular implementations shown and described herein may be illustrative of the invention and its best mode and may be not intended to otherwise limit the scope of the present invention in any way. Other variations may be within the scope of the following claims.

While this specification contains many specifics, these should not be construed as limitations on the scope of the invention or of what can be claimed, but rather as descriptions of features specific to particular implementations of the invention. Headings herein may be not intended to limit the invention, embodiments of the invention, or other matter disclosed under the headings.

Herein, the term "or" may be intended to be inclusive, wherein "A or B" includes A or B and also includes both A and B. As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

The terminology used herein is for the purpose of describing particular embodiments only and is not intended to be limiting of the invention. As used herein, the singular forms "a," "an," and "the" may be intended to include the plural forms as well, unless the context clearly indicates otherwise.

The corresponding structures, materials, acts, and equivalents of all means or step plus function elements in the claims below may be intended to include any structure, material, or act for performing the function in combination with other claimed elements as specifically claimed.

As used herein with respect to an identified property or circumstance, "substantially" refers to a degree of deviation that is sufficiently small so as to not measurably detract from the identified property or circumstance. The exact degree of deviation allowable may in some cases depend on the specific context. As used herein, "significance" or "significant" relates to a statistical analysis of the probability that there is a non-random association between two or more entities. To determine whether or not a relationship is "significant" or has "significance," statistical manipulations of the data can be performed to calculate a probability, expressed as a "p value." Those "p values" that fall below a user-defined cutoff point are regarded as significant. In some embodiments, a "p value" less than or equal to 0.05, in some embodiments less than 0.01, in some embodiments less than 0.005, and in some embodiments less than 0.001, are regarded as significant. Accordingly, a "p value" greater than or equal to 0.05 is considered not significant.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a defacto equivalent of any other member of the same list solely based on their presentation in a common group without indications to the contrary.

What is claimed is:

1. A system, comprising:
 a heat pump system configured to control a temperature of an environment in a building;
 a water heat exchanger configured to exchange heat energy between water from a water reservoir and a refrigerant in the heat pump system; and
 a control system configured to control a flow of water between the water reservoir and the water heat exchanger, wherein the control system is configured to control the flow of water between the water reservoir and the water heat exchanger and a fan of the heat pump system in order to increase a temperature of the environment in the building when (1) the temperature of the environment in the building is lower than a desired temperature set on a thermostat pertaining to the environment in the building, and (2) a temperature of water in the water reservoir is higher than an ambient air temperature outside of the building.

2. The system as recited in claim 1, wherein the control system is configured to control the flow of water between the water reservoir and the water heat exchanger and a fan of the heat pump system in order to increase a temperature of water in the water reservoir when (1) a temperature of the environment in the building is higher than a desired temperature set on a thermostat pertaining to the environment in the building, and (2) the heat pump system is operating in a cooling mode configured to decrease a temperature of the environment in the building.

3. The system as recited in claim 1, wherein the control system is configured to control the flow of water between the water reservoir and the water heat exchanger and a fan of the heat pump system in order to decrease a temperature of the environment in the building when (1) the temperature of the environment in the building is higher than a desired temperature set on a thermostat pertaining to the environment in the building, and (2) a temperature of water in the water reservoir is lower than a desired temperature set on a water reservoir thermostat, and (3) the heat pump system is operating in a cooling mode configured to decrease a temperature of the environment in the building.

4. The system as recited in claim 1, wherein the control system is coupled to:
 a heat pump system compressor ON/OFF sensor configured to signal to the control system when a compressor of the heat pump system is powered on or not;
 a heat pump system reversing valve position sensor configured to signal to the control system whether the heat pump system is operating in a cooling mode or a heating mode;
 an ambient temperature sensor configured to signal to the control system a temperature of ambient air outside of the building;
 a water reservoir temperature sensor configured to signal to the control system a temperature of the water in the water reservoir;
 a water heat exchanger refrigerant temperature sensor configured to signal to the control system a temperature of the refrigerant exiting from the water heat exchanger;
 a water flow control sensor configured to signal to the control system a flow rate of water through the water heat exchanger; and
 a water diversion system configured to control a flow of water between the water reservoir and the water heat exchanger in response to command signals received from the control system.

5. A system, comprising:
 a heat pump system configured to control a temperature of an environment in a building;
 a water heat exchanger configured to exchange heat energy between water from a water reservoir and a refrigerant in the heat pump system; and
 a control system configured to control a flow of water between the water reservoir and the water heat exchanger, wherein the control system is configured to control the flow of water between the water reservoir and the water heat exchanger and a fan of the heat pump system in order to decrease a temperature of water in the water reservoir, while increasing a temperature of the environment in the building if the temperature of water in the water reservoir is above a heat pump working low temperature limit.

6. A system, comprising:
a heat pump system configured to control a temperature of an environment in a building;
a water heat exchanger configured to exchange heat energy between water from a water reservoir and a refrigerant in the heat pump system; and
a control system configured to control a flow of water between the water reservoir and the water heat exchanger, wherein the control system is configured to control the flow of water between the water reservoir and the water heat exchanger and a fan of the heat pump system in order to decrease a temperature of the environment in the building when (1) the temperature of the environment in the building is higher than a desired temperature set on a thermostat pertaining to the environment in the building, and (2) a temperature of water in the water reservoir is below an ambient air temperature outside of the building, and (3) the heat pump system is operating in a cooling mode configured to decrease a temperature of the environment in the building.

7. A system suitable for heating or cooling an environment within a building and heating or cooling water in a water reservoir, the system comprising:
a water heat exchanger configured to exchange heat energy between water and a refrigerant;
conduits configured to flow the refrigerant within a refrigerant loop of a heat pump system through the water heat exchanger which is coupled between a reversing valve of the heat pump system and coils of an outdoor unit of the heat pump system, wherein the coils are part of the refrigerant loop of the heat pump system;
a water diversion system coupled between the water reservoir and the water heat exchanger; and
a control system configured to selectively control operation of the water diversion system in order to transfer water between the water reservoir and the water heat exchanger, wherein the control system is configured to transfer water between the water reservoir and the water heat exchanger in order to decrease a temperature of water in the water reservoir, while increasing a temperature of the environment within the building if the temperature of water in the water reservoir is above a heat pump working low temperature limit.

8. The system as recited in claim 7, further comprising:
a heat pump system compressor ON/OFF sensor configured to signal to the control system whether a compressor of the heat pump system is in operation;
a heat pump mode sensor configured to signal to the control system whether the heat pump system is operating in a cooling mode configured to decrease a temperature of the environment within the building or a heating mode configured to increase a temperature of the environment within the building;
an outdoor temperature sensor configured to signal to the control system a temperature of ambient air outside of the building;
a water temperature sensor configured to signal to the control system a temperature of water in the water reservoir;
a refrigerant temperature sensor configured to signal to the control system a temperature of the refrigerant transferred between the water heat exchanger and the coils of the outdoor unit of the heat pump system; and
a water flow sensor configured to signal to the control system a rate of water flow through the water heat exchanger.

9. The system as recited in claim 7, wherein the control system is configured to transfer water between the water reservoir and the water heat exchanger in order to increase a temperature of water in the water reservoir when (1) a temperature of the environment within the building is higher than a desired temperature setting for the environment within the building, and (2) the heat pump system is operating in a cooling mode configured to decrease a temperature of the environment within the building.

10. The system as recited in claim 7, wherein the control system is configured to transfer water between the water reservoir and the water heat exchanger in order to decrease a temperature of the environment within the building when (1) the temperature of the environment within the building is higher than a desired temperature setting for the environment within the building, and (2) a temperature of water in the water reservoir is lower than a desired temperature setting on a water reservoir thermostat configured to measure a temperature of water in the water reservoir, and (3) the heat pump system is operating in a cooling mode configured to decrease a temperature of the environment within the building.

11. The system as recited in claim 10, wherein the control system is configured to turn off a fan of the heat pump system while (1) water is being transferred between the water reservoir and the water heat exchanger, and (2) a temperature of the refrigerant is below a predetermined temperature, wherein the fan is configured to flow air past the coils of the outdoor unit of the heat pump system.

12. A system suitable for heating or cooling an environment within a building and heating or cooling water in a water reservoir, the system comprising:
a water heat exchanger configured to exchange heat energy between water and a refrigerant;
conduits configured to flow the refrigerant within a refrigerant loop of a heat pump system through the water heat exchanger which is coupled between a reversing valve of the heat pump system and coils of an outdoor unit of the heat pump system, wherein the coils are part of the refrigerant loop of the heat pump system;
a water diversion system coupled between the water reservoir and the water heat exchanger; and
a control system configured to selectively control operation of the water diversion system in order to transfer water between the water reservoir and the water heat exchanger, wherein the control system is configured to transfer water between the water reservoir and the water heat exchanger in order to increase a temperature of the environment within the building when (1) the temperature of the environment within the building is lower than a desired temperature setting for the environment within the building, and (2) a temperature of water in the water reservoir is higher than an ambient air temperature outside of the building.

13. The system as recited in claim 12, wherein the control system is configured to turn off a fan of the heat pump system while water is being transferred between the water reservoir and the water heat exchanger, wherein the fan is configured to flow air past the coils of the outdoor unit of the heat pump system.

14. A system suitable for heating or cooling an environment within a building and heating or cooling water in a water reservoir, the system comprising:

a water heat exchanger configured to exchange heat energy between water and a refrigerant;

conduits configured to flow the refrigerant within a refrigerant loop of a heat pump system through the water heat exchanger which is coupled between a reversing valve of the heat pump system and coils of an outdoor unit of the heat pump system, wherein the coils are part of the refrigerant loop of the heat pump system;

a water diversion system coupled between the water reservoir and the water heat exchanger; and a control system configured to selectively control operation of the water diversion system in order to transfer water between the water reservoir and the water heat exchanger, wherein the control system is configured to transfer water between the water reservoir and the water heat exchanger in order to decrease a temperature of the environment within the building when (1) the temperature of the environment within the building is higher than a desired temperature setting for the environment within the building, and (2) a temperature of water in the water reservoir is below an ambient air temperature outside of the building, and (3) the heat pump system is operating in a cooling mode configured to decrease a temperature of the environment within the building.

15. A method for heating or cooling an environment within a building and heating or cooling water in a water reservoir, the method comprising:

determining (1) whether a compressor of a heat pump system is powered ON, and (2) whether the heat pump system is operating in a heating or cooling mode, wherein the heating mode the heat pump system is configured to increase a temperature of the environment within the building, and wherein the cooling mode the heat pump system is configured to decrease the temperature of the environment within the building;

if it is determined that the compressor of the heat pump system is powered ON and the heat pump system is operating in the heating mode, determining whether a temperature of the water in the water reservoir is greater than a temperature of ambient air external to the building;

if it is determined that the temperature of the water in the water reservoir is greater than the temperature of ambient air external to the building, activating a water diversion system to transfer water between the water reservoir and a water heat exchanger configured to exchange heat energy between the transferred water and a refrigerant of the heat pump system to thereby increase a temperature of the environment within the building by using the heat energy captured from the water by the refrigerant within the water heat exchanger.

16. The method as recited in claim 15, further comprising turning off a fan that is configured to flow air past coils of the heat pump system while water is being transferred between the water reservoir and the water heat exchanger.

17. The method as recited in claim 16, wherein if it is determined that the compressor of the heat pump system is powered ON and the heat pump system is operating in the cooling mode, the method further comprising:

determining whether the temperature of water in the water reservoir is below a predetermined temperature; and if it is determined that the temperature of water in the water reservoir is below the predetermined temperature, activating the water diversion system to transfer water between the water reservoir and the water heat exchanger configured to exchange heat energy between the transferred water and the refrigerant of the heat pump system to thereby decrease the temperature of the environment within the building by using the heat energy captured from the refrigerant by the water within the water heat exchanger.

18. The method as recited in claim 17, further comprising turning off a fan that is configured to flow air past coils of the heat pump system while water is being transferred between the water reservoir and the water heat exchanger.

\* \* \* \* \*